US011219974B2

(12) United States Patent
Bae et al.

(10) Patent No.: US 11,219,974 B2
(45) Date of Patent: Jan. 11, 2022

(54) FASTENING APPARATUS AND METHOD FOR OPERATING SAME

(71) Applicants: HYUNDAI MOTOR COMPANY, Seoul (KR); KIA MOTORS CORPORATION, Seoul (KR)

(72) Inventors: Jun Hyeok Bae, Ulsan (KR); Jeong Seong An, Ulsan (KR); Jong Seung Park, Ulsan (KR); Young Seok Lee, Ulsan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 602 days.

(21) Appl. No.: 15/726,631

(22) Filed: Oct. 6, 2017

(65) Prior Publication Data
US 2018/0339378 A1     Nov. 29, 2018

(30) Foreign Application Priority Data

May 29, 2017    (KR) .................. 10-2017-0066219

(51) Int. Cl.
*B23P 19/06*      (2006.01)
(52) U.S. Cl.
CPC .................. *B23P 19/069* (2013.01)
(58) Field of Classification Search
CPC ..... B23P 2700/50; B23P 19/06; B23P 19/069; B25B 23/005; B25B 23/04; B25B 23/06; B25B 23/065; B25B 23/08; B25B 23/10
USPC ........................ 81/57.22, 57.23, 57.24, 57.32
See application file for complete search history.

(56) References Cited

U.S. PATENT DOCUMENTS

| 4,675,967 | A | * | 6/1987 | Okada | ..................... B23P 19/06 29/240 |
| 4,873,760 | A | * | 10/1989 | Watanabe | ............... B23P 19/06 29/714 |
| 2010/0218647 | A1 | * | 9/2010 | Akita | .................... B23P 19/069 81/57.32 |
| 2017/0361407 | A1 | * | 12/2017 | Kwak | .................... B23P 19/04 |

FOREIGN PATENT DOCUMENTS

CN        104801799 A     7/2015

OTHER PUBLICATIONS

Chinese Office Action dated Oct. 29, 2020 from the corresponding Chinese Application No. 201711011501.X, 14 pp.

* cited by examiner

*Primary Examiner* — David B. Thomas
*Assistant Examiner* — Jonathan G Santiago Martinez
(74) *Attorney, Agent, or Firm* — Lempia Summerfield Katz LLC

(57) ABSTRACT

A fastening apparatus includes: a main structure, a movable structure mounted to be vertically movable with respect to the main structure, a support connected to the movable structure, a plurality of fastening devices mounted on the support, and a variation mechanism to vary fastening positions of the fastening devices. In particular, the variation mechanism changes the fastening positions on a 2-dimensional coordinate, and also individually moves the plurality of fastening devices along a radial coordinate and an angular coordinate of a polar coordinate system.

13 Claims, 14 Drawing Sheets

FASTENING APPARATUS AND METHOD FOR OPERATING SAME

CROSS-REFERENCE TO RELATED APPLICATION

This application claims priority to and the benefit of Korean Patent Application No. 10-2017-0066219, filed on May 29, 2017, which is incorporated herein by reference in its entirety.

FIELD

The present disclosure relates to a fastening apparatus for fastening a workpiece, and a method for operating the same.

BACKGROUND

The statements in this section merely provide background information related to the present disclosure and may not constitute prior art.

A fastening apparatus having a fastening device such as an impact wrench and a nut runner has been used when a workpiece such as a ladder frame, a head cover, an oil pan, and a chain cover is fastened through a fastener such as a bolt, a nut, a screw, a piece and the like.

The fastening apparatus according to the related art is configured such that a plurality of fastening devices are fixed or some of the fastening devices are partially movable in accordance with the model and the type of a workpiece.

We have discovered that the fastening apparatus according to the related art has a disadvantage in that it is difficult to cope with a change of the model of the workpiece, a change of a component, and the like. For example, when various models and various components are to be complexly fastened, the fastening apparatus according to the related art may not flexibly cope with the situation, and accordingly, production efficiency may be undermined.

When manufacturing process for a specific product is terminated, it is unnecessary to fasten components, and when it is impossible to reuse some fastening apparatuses, the fastening apparatus may be discarded.

SUMMARY

The present disclosure provides a fastening apparatus which may flexibly cope with manufacturing conditions, a change of the model of a workpiece, a change of a component, and the like, and also provides a method for operating the same.

The technical objects of the present disclosure are not limited to the above-mentioned one, and the other unmentioned technical objects will become apparent to those skilled in the art from the following description.

In accordance with an aspect of the present disclosure, there is provided a fastening apparatus including a plurality of fastening devices, and a variation mechanism configured to vary fastening positions of the fastening devices on a 2-dimensional coordinate.

The variation mechanism may be configured to individually move the plurality of fastening devices along a radial coordinate and an angular coordinate of a polar coordinate system.

The variation mechanism may include one or more support plates, and a plurality of base blocks arranged radially with respect to the support plates.

The plurality of base blocks may be configured to be movable along circumferential directions of the support plates, the fastening devices may be connected to the base blocks, respectively, and the fastening devices may be configured to be movable along a radial direction of the support plates.

The base blocks may extend along the radial direction of the support plates.

Each of the support plates may have one or more guide rails, the one or more guide rails may have a ring shape, and the base blocks may move along the one or more guide rails.

A guide member guided by the guide rails may be provided on an upper surface of each of the base blocks.

The variation mechanism may include a first movement mechanism configured to move the base blocks along the circumferential directions of the support plates, and a second movement mechanism configured to move the fastening devices along the radial direction of the support plates.

The first movement mechanism may include a plurality of driving motors individually mounted on the plurality of base blocks, bevel pinions individually connected to the plurality of driving motors, and a bevel ring gear engaged with the plurality of bevel pinions.

The bevel ring gear may be fixed to the support plates.

The second movement mechanism may include a plurality of linear guides individually fixed to the plurality of base blocks, and a plurality of movable blocks individually connected to the plurality of linear guides to be movable.

The fastening devices may be individually connected to a corresponding movable block of the plurality of movable blocks.

Each of the linear guides may include a rotatable lead screw, a nut configured to travel along the rotatable lead screw, and a motor configured to rotate the rotatable lead screw.

The nuts are fixed to the movable blocks, respectively.

The fastening apparatus may further include a plurality of cable carriers configured to guide a plurality of cables individually connected to the variation mechanism and the fastening devices from the center toward an upper side of the variation mechanism.

In accordance with another aspect of the present disclosure, there is provided a method for operating a fastening apparatus comprising a plurality of fastening devices, and support plates to which the plurality of fastening devices are connected by a variation mechanism to be movable.

The method includes moving the fastening devices along circumferential directions of the support plates or along a radial direction of the support plates depending on a shape and a structure of a workpiece, so that positions of the fastening devices vary.

The method further includes moving the variation mechanism in a vertical direction so as to vary vertical positions of the fastening devices.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
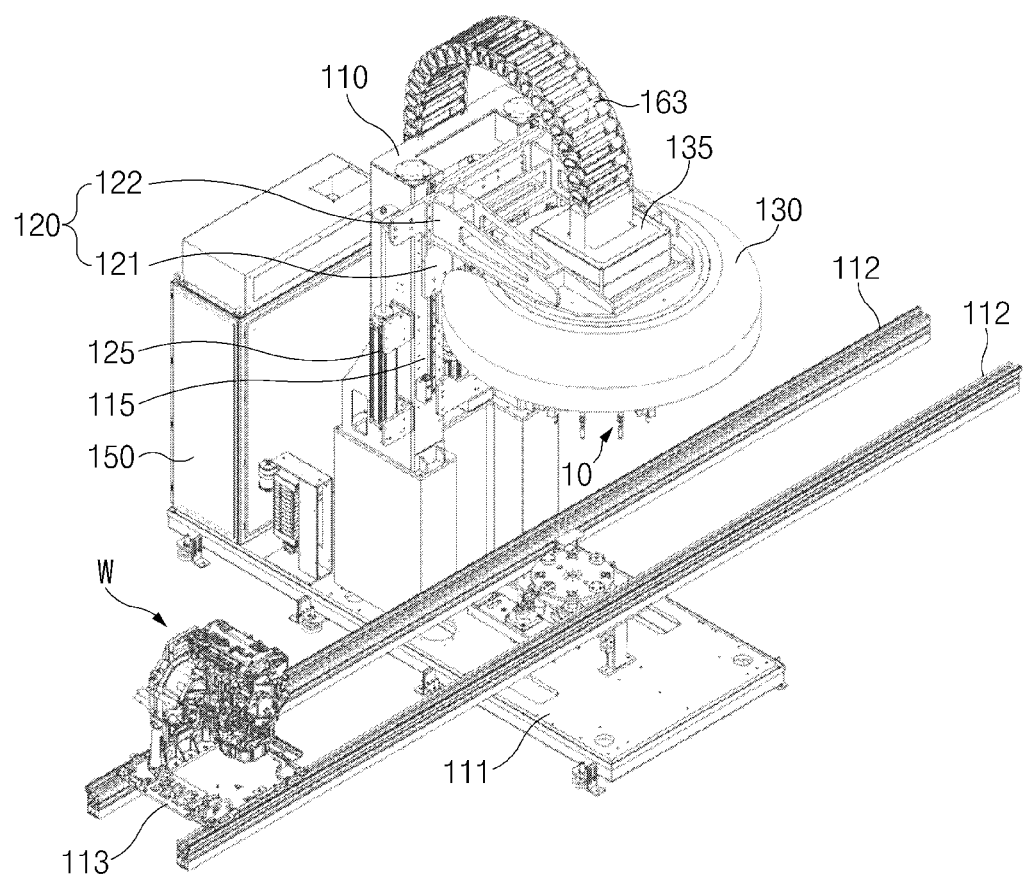
FIG. 1 is a perspective view illustrating a fastening apparatus according to one form of the present disclosure.

The drawings described herein are for illustration purposes only and are not intended to limit the scope of the present disclosure in any way.

DETAILED DESCRIPTION

Hereinafter, exemplary forms of the present disclosure will be described in detail with reference to the accompanying drawings. It should be noted that when components in the drawings are designated by reference numerals, the same components have the same reference numerals as far as possible even though the components are illustrated in different drawings. Further, in description of forms of the present disclosure, when it is determined that detailed descriptions of well-known configurations or functions disturb understanding of the forms of the present disclosure, the detailed descriptions will be omitted.

The following description is merely exemplary in nature and is not intended to limit the present disclosure, application, or uses.

Also, in the description of the forms of the present disclosure, the terms such as first, second, A, B, (a) and (b) may be used. Each of the terms is merely used to distinguish the corresponding component from other components, and does not delimit an essence, an order or a sequence of the corresponding component. Further, all terms used herein, including technical terms and scientific terms, may have the same meanings as those generally understood by those skilled in the art to which the present disclosure pertains as long as the terms are differently defined. The terms defined in a generally used dictionary should be interpreted to have the same meanings as those in the context of the related art, and are not interpreted as ideal or excessively formal meanings as long as the terms are not clearly defined in the present application.

Figure 2:
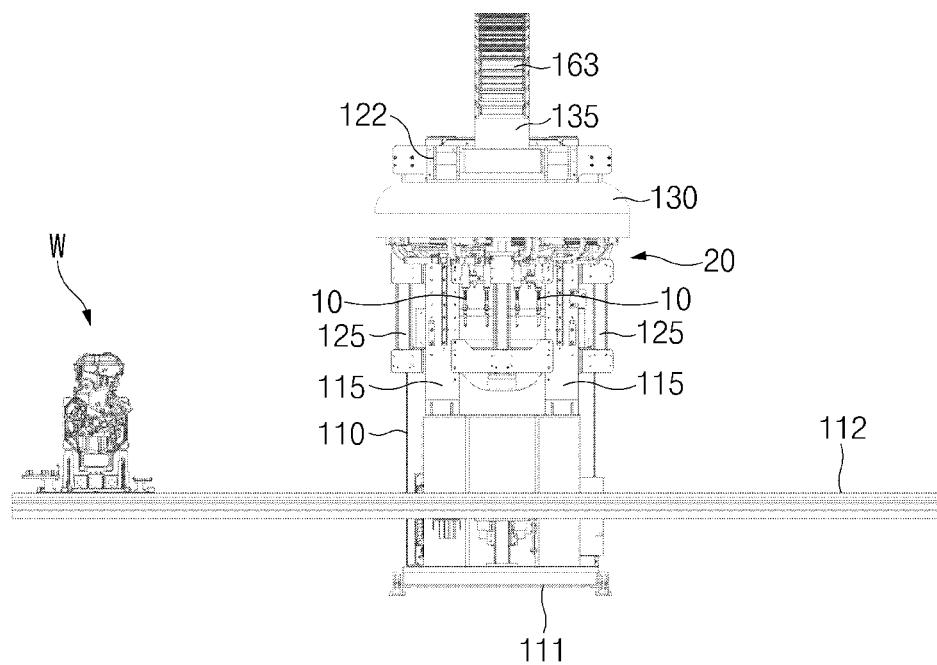
FIG. 2 is a front view illustrating the fastening apparatus according to the form of the present disclosure.
Figure 3:
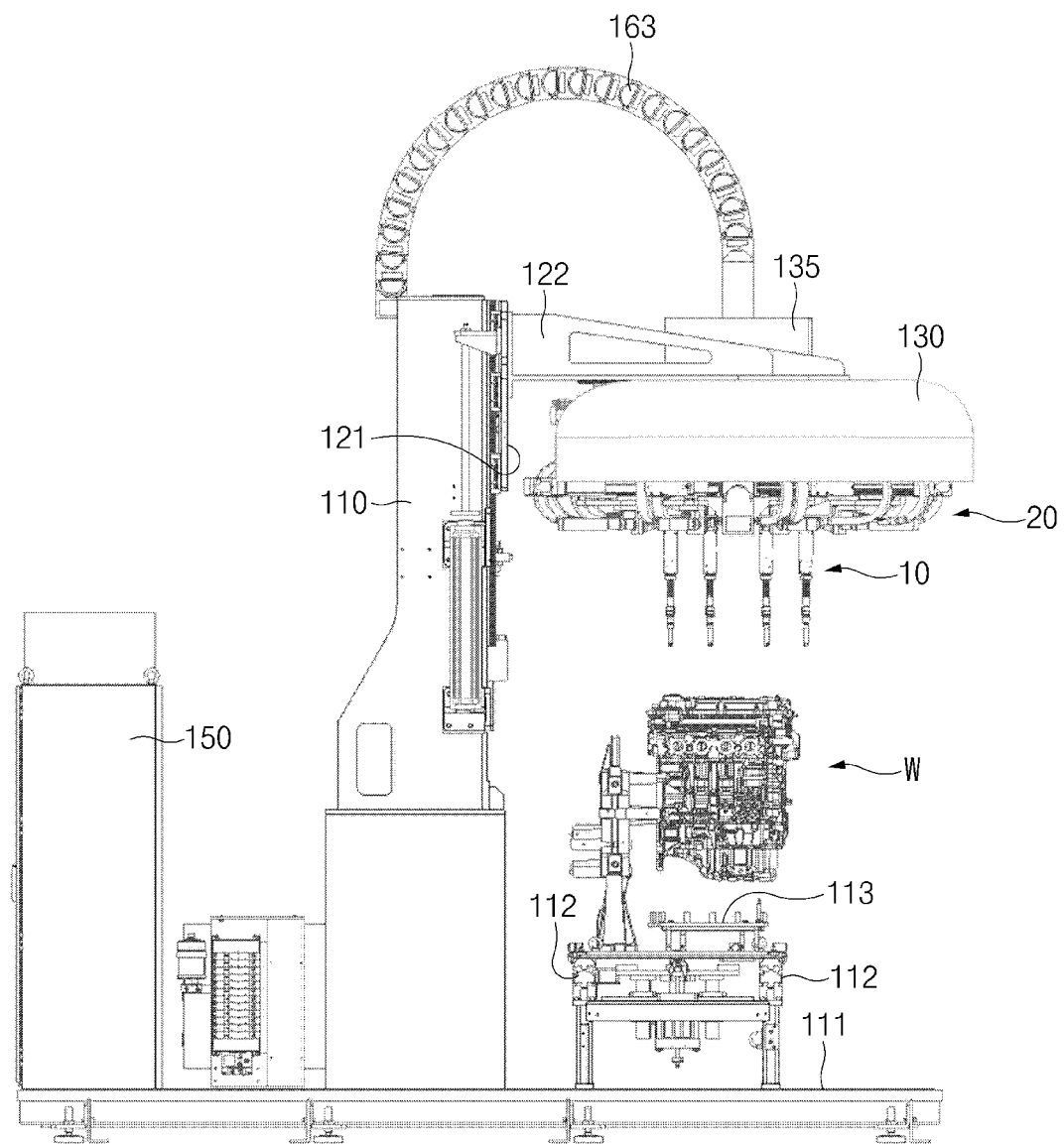
FIG. 3 is a side view illustrating the fastening apparatus according to the form of the present disclosure.
Figure 4:
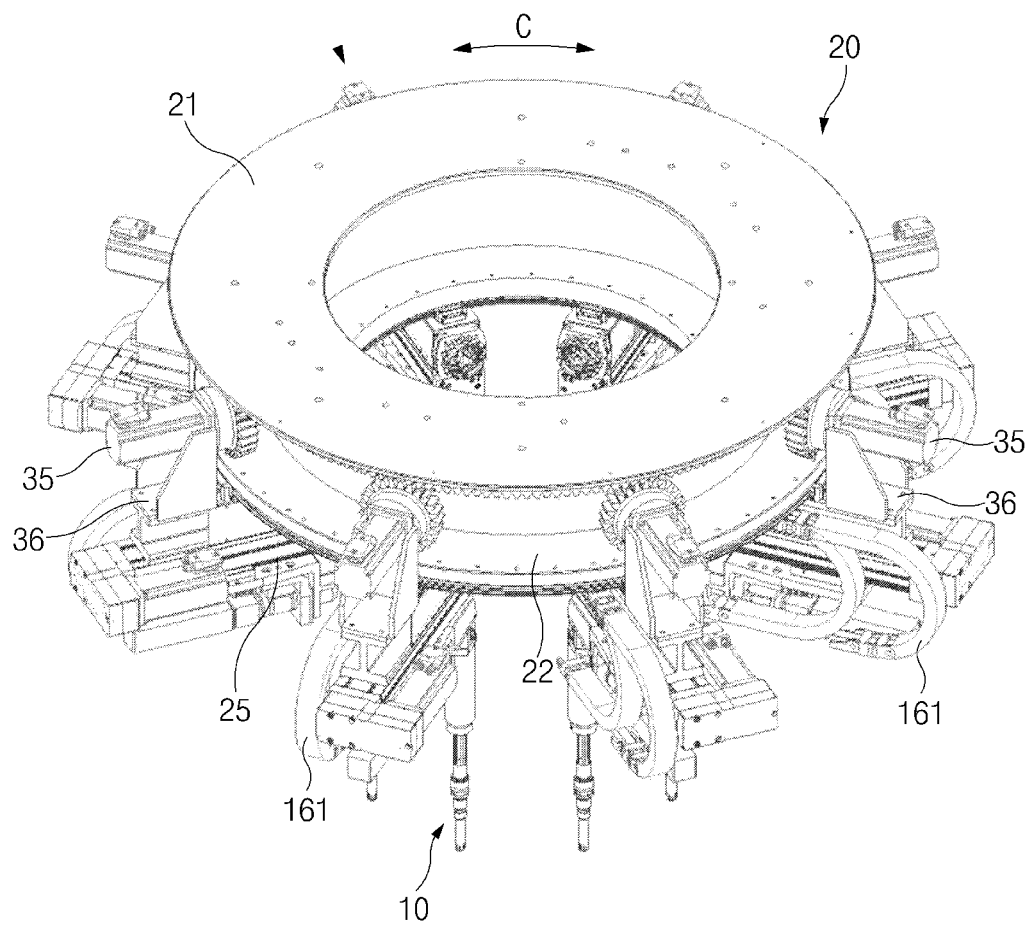
FIG. 4 is a perspective view illustrating a variation mechanism of the fastening apparatus in one form of the present disclosure.

Referring to FIGS. 1 to 3, a fastening apparatus 100 according to one form of the present disclosure may include a main structure 110, a movable structure 120 mounted to be vertically movable with respect to the main structure 110, a support 130 connected to the movable structure 120, a plurality of fastening devices 10 mounted on the support 130, and a variation mechanism 20 configured to vary positions of the plurality of fastening devices 10.

The main structure 110 may stand upright vertically with respect to a base 111, and the main structure 110 may have a guide 115 vertically extending. A controller 150 may be connected to the main structure 110.

A pair of transfer rails 112 may be arranged on a front side of the main structure 110 in a horizontal direction, and a palette 113 may be transferred through the pair of transfer rails 112. The palette 113 may be formed such that various kinds of workpieces W may be seated thereon.

The movable structure 120 may have a vertical part 121 vertically extending and a horizontal part 122 horizontally extending from the vertical part 121. The vertical part 121 may be vertically guided along the guide 115 of the main structure 110, and the support 130 may be connected to a free end of the horizontal part 112 through a fastener or the like.

The movable structure 120 may vertically move by one or more actuators 125. The one or more actuators 125 may be a hydraulic cylinder, or the like.

As illustrated in FIGS. 1 to 3, the pair of actuators 125 may be installed on opposite surfaces of the main structure to be symmetric to each other, and the pair of actuators 125 may be configured to vertically move opposite ends of the movable structure 120.

The support 130 is connected to the free end of the movable structure 120, and the support 130 may be formed to have a shape of a dome. The plurality of fastening devices 10 and the variation mechanism 20 may be connected to each other in an interior of the support 130.

The plurality of fastening devices 10 may be installed to be relatively movable with respect to each other by the variation mechanism 20, and each of the fastening devices 10 may be configured to provide a torque fastening a fastener such as a bolt and a nut.

According to the form, the fastening device 10 may be a nut runner configured to rotate the fastener such as a bolt and a nut by driving a servo motor.

Figure 6A:
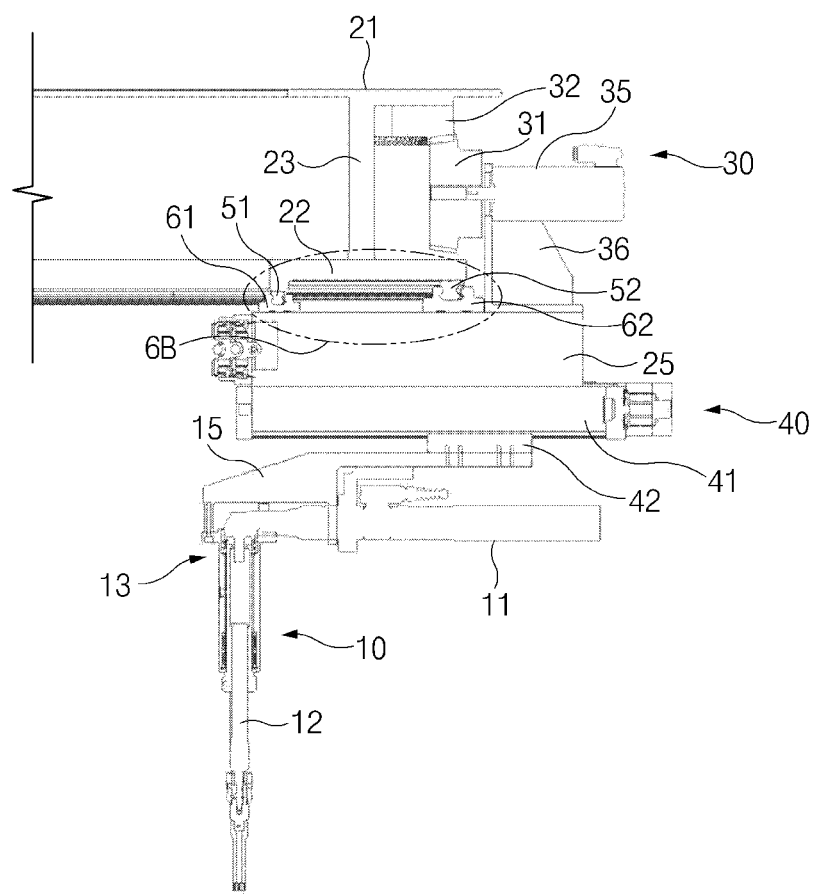
FIG. 6A is a sectional view taken along line A-A' of FIG. 5.

According to a detailed form, as illustrated in FIG. 6A, the fastening device 10 may include a motor 11 configured to generate a rotational torque, an output shaft 12 that is perpendicular to a shaft line of the motor 11, and a gear assembly 13 configured to transfer the rotational torque of the motor 11 to the output shaft 12.

In this way, the fastening device 10 may be a right angle fastening device in which a motor 11 and an output shaft 12 are perpendicular to each other, so that the positions of the fastening devices 10 may be more effectively adjusted by the variation mechanism 20.

The variation mechanism 20 may be configured to adjust the positions of the fastening devices 10 by selectively moving the plurality of fastening devices 10 on a 2-dimensional coordinate system.

According to the form, the variation mechanism 20 may be configured to individually vary the positions of the plurality of fastening devices 10 according to a radial coordinate and an angular coordinate of a polar coordinate system.

The variation mechanism 20 may include a first support plate 21, a second support plate 22 spaced downwards apart from the first support plate 21, and a plurality of base blocks 25 arranged radially with respect to the first support plate 21 and the second support plate 22.

The first support plate 21 may be connected to the support 130, the first support plate 21 and the second support plate 22 may be formed to have an annular shape, and the first support plate 21 and the second support plate 22 may be connected to each other through a connector 23.

A plurality of guide rails 51 and 52 may be fixed to a bottom surface of the second support plate 22, and the plurality of guide rails 51 and 52 may have a shape of a ring.

The plurality of guide rails 51 and 52 may include a first guide rail 51 and a second guide rail 52 having different radii.

The first guide rail 51 may have a pair of grooves 51a formed on side surfaces thereof, and the second guide rail 52 may have a pair of grooves 52a formed on side surfaces thereof. A radius of the first guide rail 51 is smaller than a radius of the second guide rail 52, and the first guide rail 51 and the second guide rail 52 may be arranged in a form of a concentric circle.

The plurality of base blocks 25 may be radially arranged, and each of the base blocks 25 may extend along a radial direction of the support plates 21 and 22. One end of the base block 25 may be arranged toward an inner diameter of the guide rails 51 and 52, and the other end of the base block 25 may be arranged toward an outer diameter of the guide rails 51 and 52.

The base block 25 may individually move along a circumferential direction (see arrow C of FIG. 5) along the plurality of guide rails 51 and 52.

A plurality of guide members 61 and 62 may be fixed to an upper surface of the base block 25. The plurality of guide members 61 and 62 may include a first guide member 61 guided to the first guide rail 51, and a second guide member 62 guided to the second guide rail 52.

The first guide member 61 may have a pair of side walls 63, a boss 61a may be formed on each of the side walls 63, and the bosses 61a of the first guide member 61 may be inserted into the grooves 51a of the first guide rail 51, respectively.

The second guide member 62 may have a pair of side walls 64, a boss 62a may be formed on the side wall 64, and the bosses 62a of the second guide member 62 may be inserted into the grooves 52a of the second guide rail 52, respectively.

In this way, the bosses 61a and 62a of the first and second guide members 61 and 62 are individually inserted into the grooves 51a and 52a of the first and second guide rails 51 and 52, so that the base block 25 is supported on the second support plate 22, and may move along the first and second guide rails 51 and 52 as well.

The first guide member 61 may be arranged to be adjacent to the one end of the base block 25, and the second guide member 62 may be arranged to be adjacent to the other end of the base block 25.

According to the form of the present disclosure, the sizes (the widths, the heights, and the like) of the first guide rail 51 and the second guide rail 52 may be differently formed, and correspondingly, the sizes (the widths, the heights, and the like) of the first guide member 61 and the second guide member 62 may be differently formed.

Figure 6B:
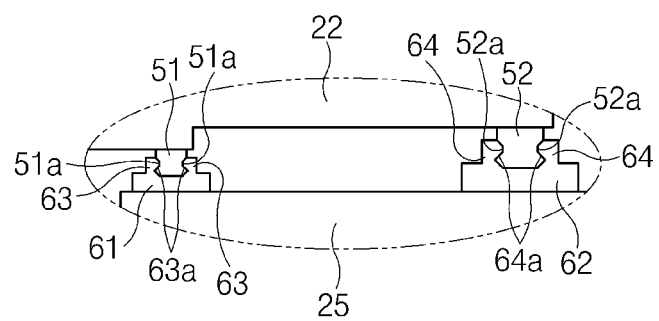
FIG. 6B is an enlarged view of a part taken from FIG. 6A.
Figure 7:
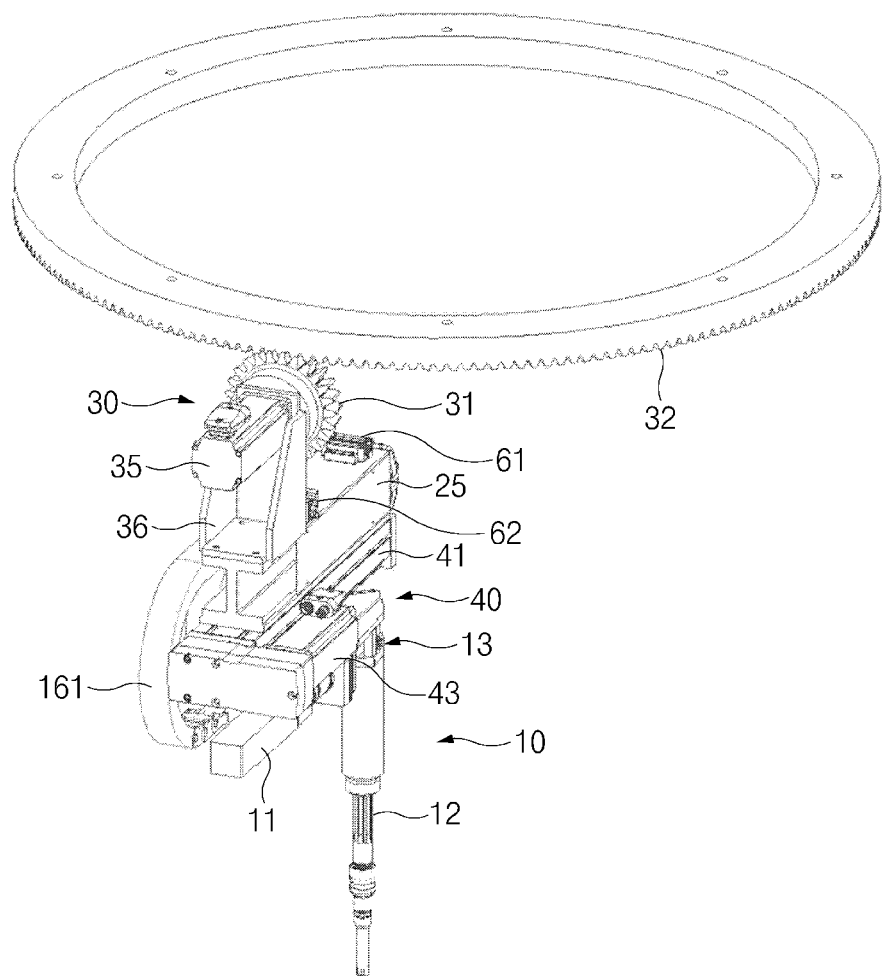
FIG. 7 is a perspective view illustrating a first movement mechanism of the variation mechanism of the fastening apparatus in one form of the present disclosure.
Figure 8:
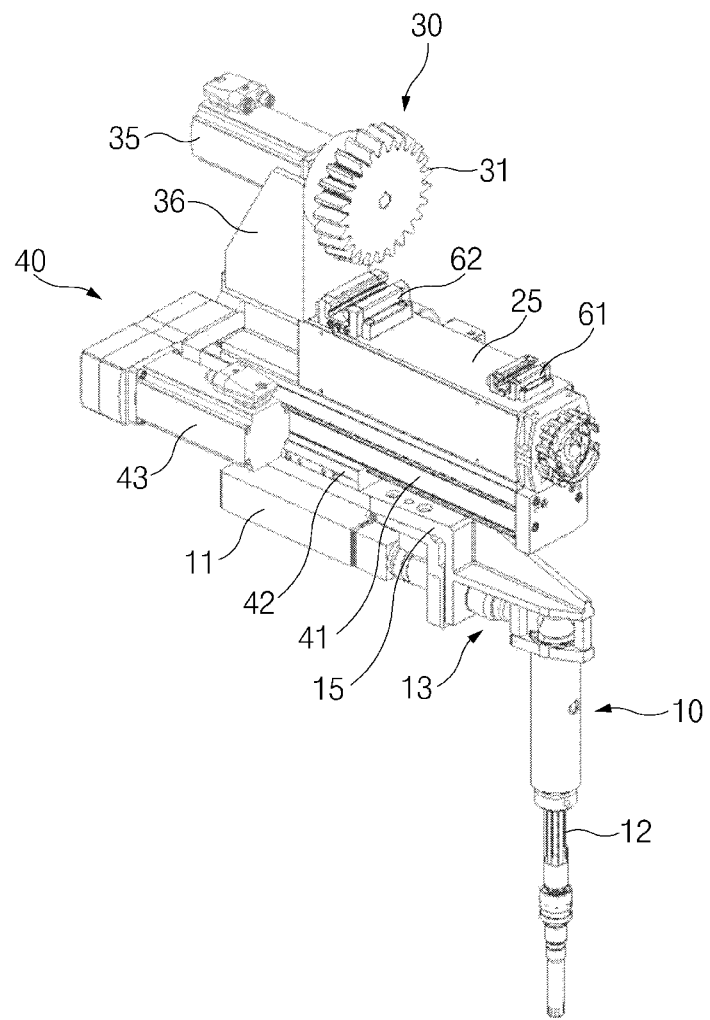
FIG. 8 is a perspective view illustrating a structure in which a base block, a driving motor of the first movement mechanism, and a linear guide of a second movement mechanism of the variation mechanism of the fastening apparatus, and a fastening device are connected to each other.
Figure 9:
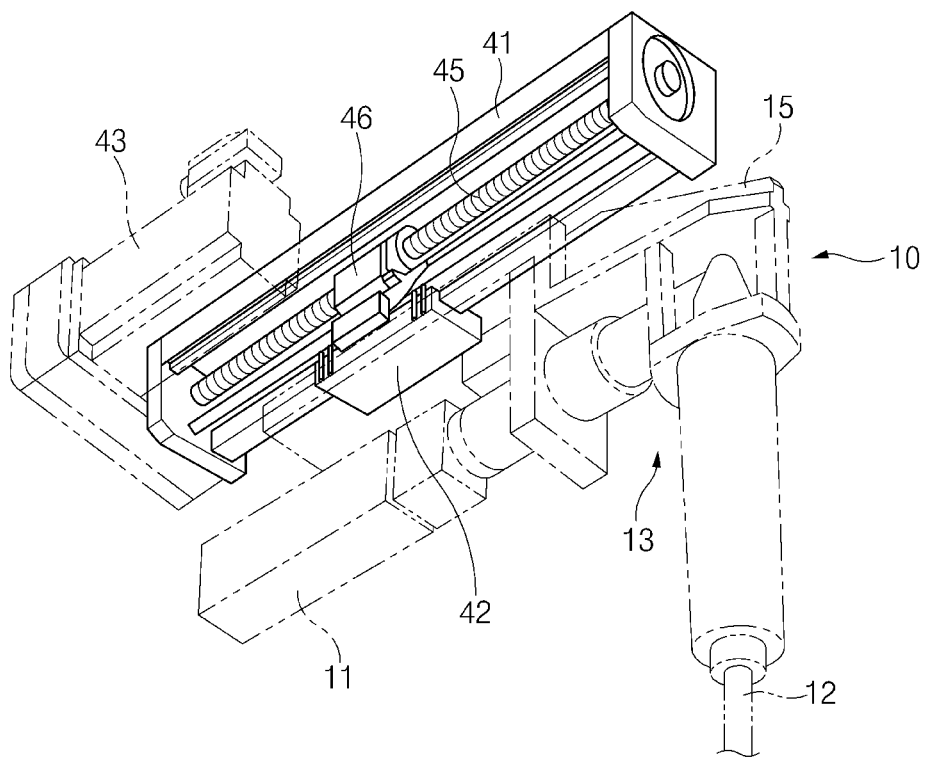
FIG. 9 is a bottom perspective view a structure in which the fastening device is connected to the linear guide of the second movement mechanism of the variation mechanism of the fastening apparatus.
Figure 10:
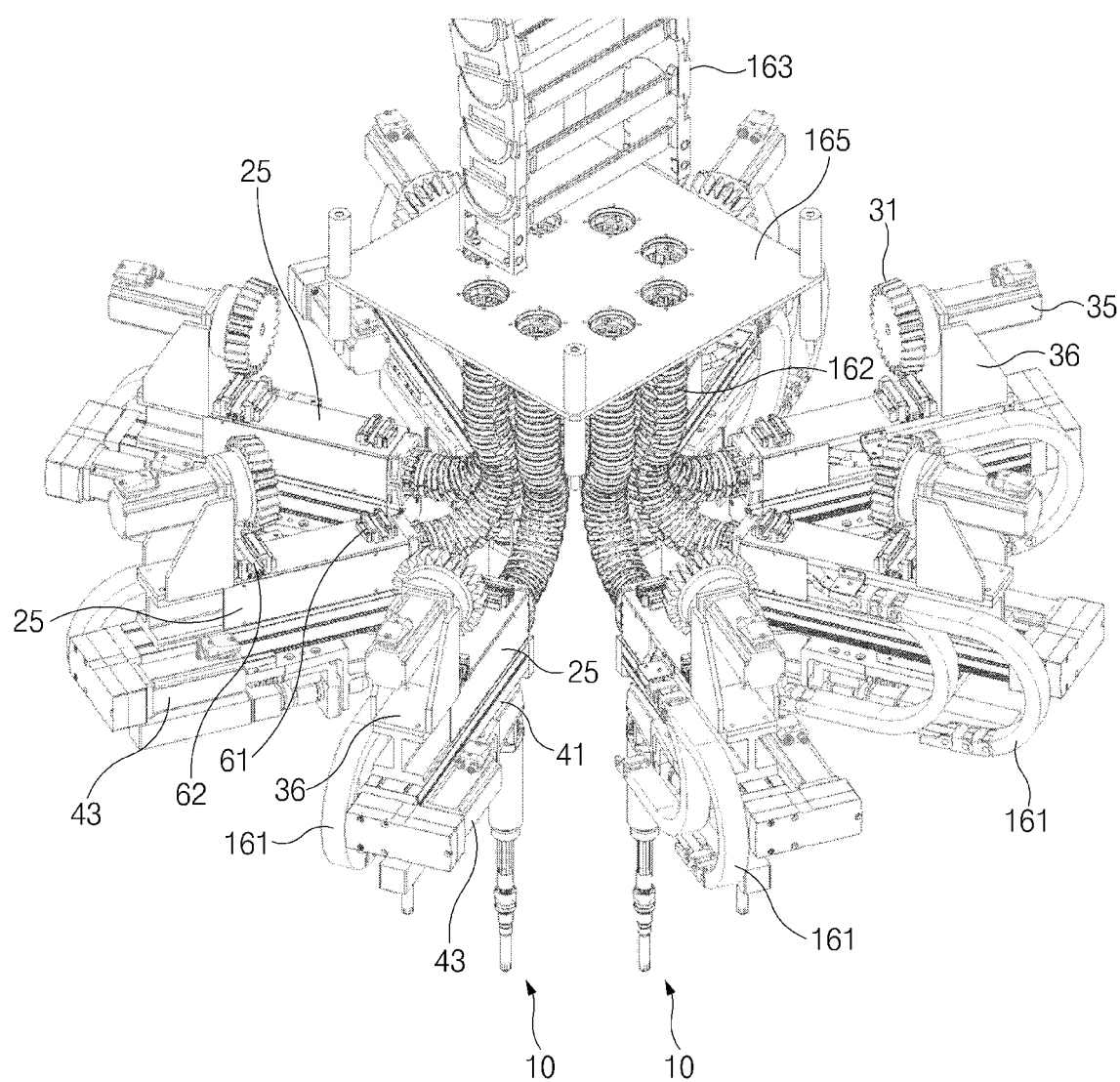
FIG. 10 is a perspective view illustrating a structure in which a plurality of cable carriers are installed in the fastening apparatus according to one form of the present disclosure.

As illustrated in FIGS. 6A-6B, the second guide rail 52 may have the size that is larger than that of the first guide rail 51, and correspondingly, the second guide member 62 may have the size that is larger than that of the first guide member 61.

The variation mechanism 20 may include a first movement mechanism 30 configured to move the base blocks 25 along circumferential directions C of the support plates 21 and 22, and a second movement mechanism 40 configured to move the fastening devices 10 along a radial direction R of the support plates 21 and 22. Accordingly, the plurality of the fastening devices 10 may be configured to be movable along the circumferential directions C and/or the radial direction R of the support plates 21 and 22.

As the first movement mechanism 30 moves the base block 25 along the circumferential direction of the first support plate 21, the position of the fastening device 10 may be adjusted along the circumferential direction of the first support plate 21.

The first movement mechanism 30 may include a plurality of driving motors 35 individually mounted on the plurality of base blocks 25, a plurality of bevel pinions individually connected to the plurality of driving motors 35, and a bevel ring gear 32 engaged with the plurality of bevel pinions 31.

The first driving motors 35 may be mounted on the upper surfaces of the base blocks 25 by medium of brackets 36, respectively, and the bevel pinions 31 may be coupled to output shafts of the first driving motors 35, respectively.

The bevel ring gear 32 may be fixed to a bottom surface of the first support plate 21 through a fastener or the like, and the bevel ring gear 32 and the first support plate 21 may be arranged in a concentric circular structure. The bevel ring gear 32 may have a shape of a ring having a specific radius.

When the first driving motors 35 are driven, the bevel pinions 31 may be rotated, the bevel pinions 31 may move along a circumferential direction C of the bevel ring gear 32, and because of this, the base blocks 25 may move along the circumferential direction C of the bevel ring gear 32. As the base blocks 25 move along the circumferential directions C of the first support plate 21 and the bevel ring gear 32, the positions of the fastening devices 10 may be adjusted along the circumferential directions C of the first support plate 21 and the bevel ring gear 32.

In this way, as the positions of the fastening devices 10 are adjusted along the circumferential direction of the first support plate 21, the circumferential positions of the fastening devices 10 may correspond to the angular coordinate of the polar coordinate system.

Figure 5:
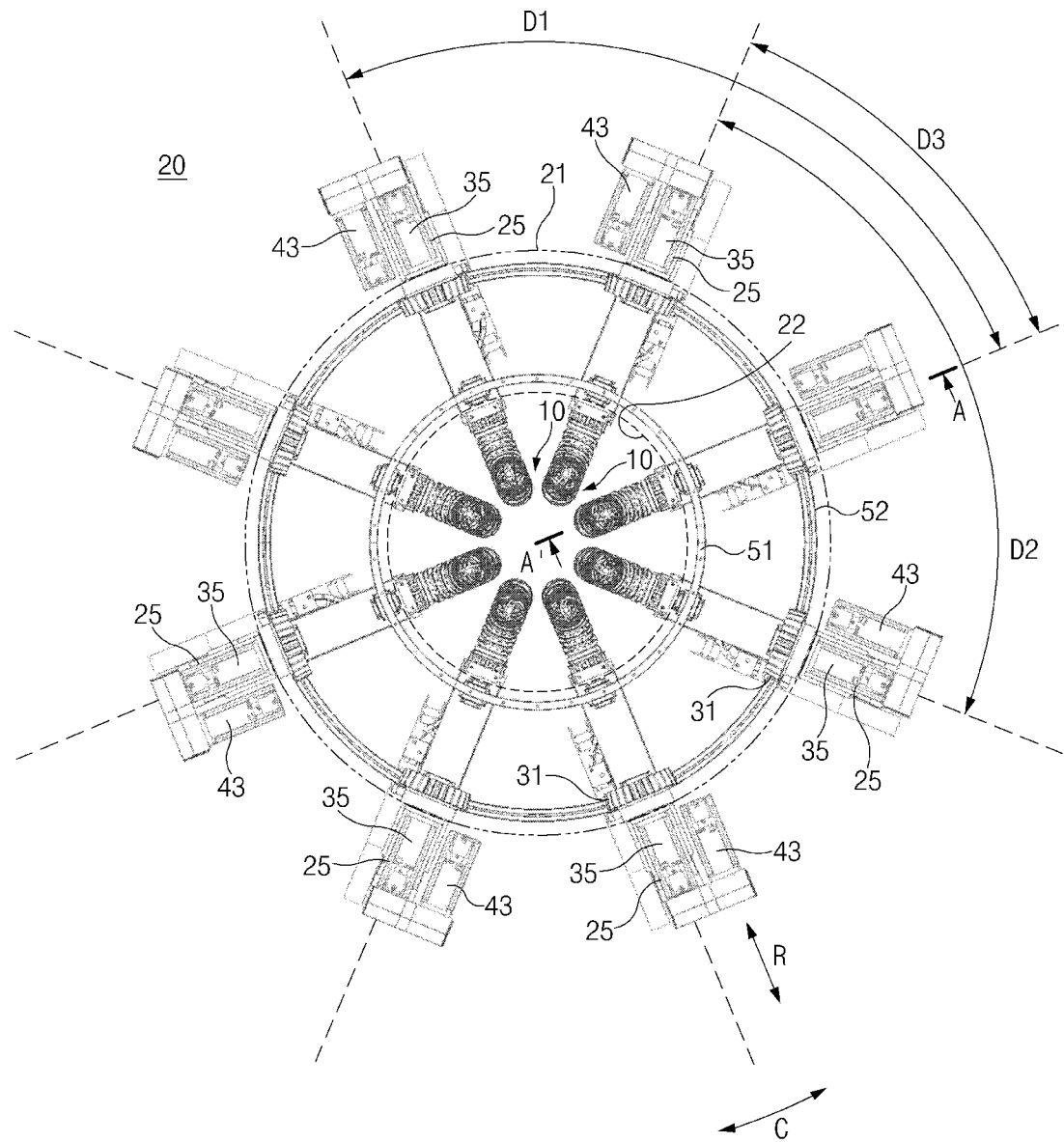
FIG. 5 is a plan view illustrating the variation mechanism of the fastening apparatus according to the form of the present disclosure.

As illustrated in FIG. 5, adjacent base blocks 25 may move within fastening areas D1 and D2 individually set by the first movement mechanism 30, and as the fastening areas D1 and D2 of the adjacent base blocks 25 overlap each other, a shared area D3 may be formed. In this way, as the shared area D3 shared by the fastening areas D1 and D2 of the adjacent base blocks 25 is formed, an interference between the fastening devices 10 may be properly evaded according to the type (the model, the shape, the structure, or the like) of the workpiece, the positions of the fastening devices 10 may be effectively adjusted, and the number of the fastening devices 10 may effectively vary as well.

The second movement mechanism 40 may include a plurality of linear guides 41 individually fixed to the plurality of base blocks 21, and a plurality of movable blocks 42 individually connected to the plurality of linear guides 41 to be movable.

Each of the liner guides 41 may include a lead screw 45, a nut 46 meshes with the lead screw 45, and a motor 43 configured to rotate the lead screw 45. When the lead screw 45 is rotated by driving the motor 43, the nut 46 may travel along the lead screw 45.

The movable blocks 42 may be fixed to the nuts 46 of the liner guides 41, respectively, and the fastening devices 10 may be connected to the movable blocks 42 through brackets 15, respectively. Accordingly, as the nuts 46 of the linear guides 41 are moved, the movable blocks 42 may move along the radial direction (see arrow R of FIG. 5) of the second support plate 22, and accordingly, the positions of the fastening devices 10 may be adjusted along the radial direction R of the second support plate 22.

In this way, as the positions of the fastening devices 10 are adjusted along the radial direction R of the second support plate 22, the circumferential positions of the fastening devices 10 may correspond to a radial coordinate of the polar coordinate system.

The fastening apparatus 100 according to the form of the present disclosure may further include a plurality of cable carriers 161, 162 and 163 configured to guide a plurality of cables individually connected to the variation mechanism 20 and the fastening devices 10 from a central portion to an upper portion of the variation mechanism 20. The plurality of cables may be individually connected to the driving motors 35 of the first movement mechanism 30, the linear guides 41 of the second movement mechanism 40, and the fastening devices 10.

The plurality of cable carriers 161, 162, and 163 may include a plurality of first cable carriers 161 individually installed on the side surfaces of the base blocks 25, a plurality of second cable carriers 162 individually connected to ends of the base blocks 25, and a third cable carrier 163 connected to the plurality of second cable carriers 162.

The first cable carriers 161 may be installed on the side surfaces of the base blocks 25, respectively, and the first cable carriers 161 may be configured to guide one or more cables in accordance with movement of the base blocks 25, respectively. According to the form, the first cable carriers 161 may be chain-type cable carriers.

The base block 25 may have an accommodation space accommodating one or more cables therein.

The second cable carriers 162 may be arranged from ends of the base blocks 25 to the upper side, and accordingly, one or more cables may be guided from the ends of the base blocks 25 to the upper side. According to the form, the second cable carriers 162 may be worm-type cable carriers.

A lower end of the third cable carrier 163 may be connected to an upper surface of the support 130 through a connection member 135, and upper ends of the second cable carriers 162 may be connected to the lower end of the third cable carrier 153 through a connection plate 165. The connection plate 165 may be arranged inside the support 130.

In this way, in the present disclosure, the plurality of cables connected to the variation mechanism 20 and the fastening devices 10 through the plurality of cable carriers 161, 162 and 163 are guided from the central portion of the variation mechanism 20 toward the support 130, so that the plurality of cables may be protected, and may be inhibited or prevented from interfering with each other as well, and because of this, operational stabilities of the variation mechanism 20 and the fastening devices 10 may be effectively implemented.

In a method for operating the above-configured fastening apparatus 100 according the present disclosure, as the base blocks 25 are moved in a circumferential direction by the first movement mechanism 30 or the base blocks 25 are moved in a radial direction by the second movement mechanism 40 according to the shape and the structure of the workpiece, the positions of the fastening devices 10 may vary.

Further, as the support 130 to which the variation mechanism 20 is connected is moved by the actuators 125 in a vertical direction as needed, the vertical positions of the fastening devices 10 may vary.

In this way, the positions of the plurality of fastening devices 10 may individually vary on a 2-dimensional coordinate system or a 3-dimensional coordinate system according to a change of the type (the model, the shape, the structure, and the like) of the workpiece, so that simultaneous fastening of a workpiece having a plurality of fastening holes may be effectively performed.

Meanwhile, examples of a workpiece W which may be fastened by the fastening apparatus 100 according to the present disclosure may include oil pans 1a, 1b, and 1c, head covers 2a, 2b, and 2c, ladder frames 3a, 3b, and 3c, and the like.

Figure 11C:
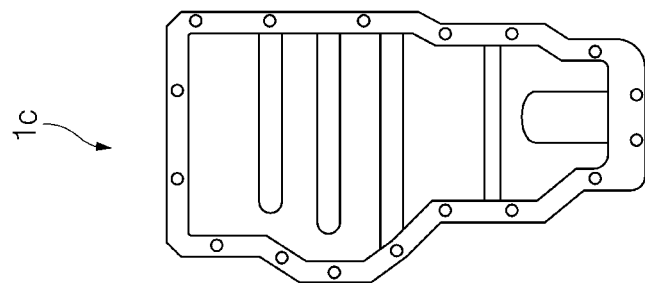
FIGS. 11A-11C are views illustrating an oil pan according to models, which may be fastened by the fastening apparatus.
Figure 11B:
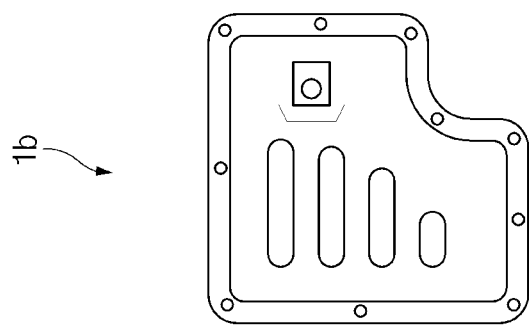
Figure 11A:
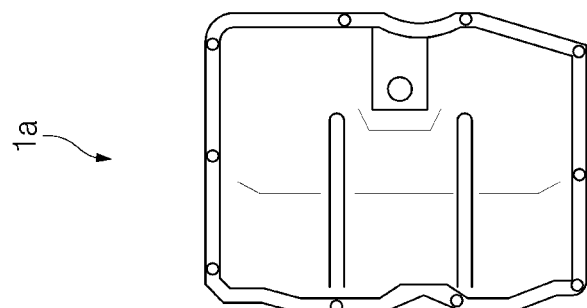

As illustrated in FIGS. 11A, 11B, and 11C, different models of the oil pans 1a, 1b, and 1c have fastening holes, positions of which are different from each other. The fastening apparatus 100 according to the present disclosure may fasten the different models of the oil pans 1a, 1b, and 1c to an engine block by adjusting the positions of the fastening devices 10 by the variation mechanism 20 according to the positions of the fastening holes of the oil pans 1a, 1b, and 1c.

Figure 12C:
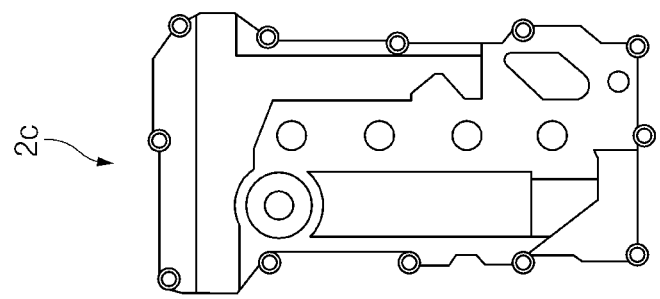
FIGS. 12A-12C are views illustrating a head cover according to models, which may be fastened by the fastening apparatus.
Figure 12B:
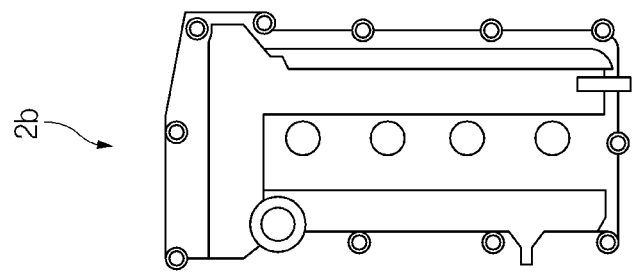
Figure 12A:
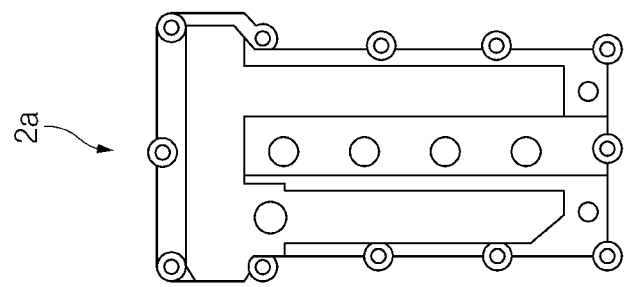

As illustrated in FIGS. 12A, 12B, and 12C, different models of the head covers 2a, 2b, and 2c have fastening holes, positions of which are different from each other. The fastening apparatus 100 according to the present disclosure may fasten the different models of the head covers 2a, 2b, and 2c to an engine block by adjusting the positions of the fastening devices 10 by the variation mechanism 20 according to the positions of the fastening holes of the head covers 2a, 2b, and 2c.

Figure 13C:
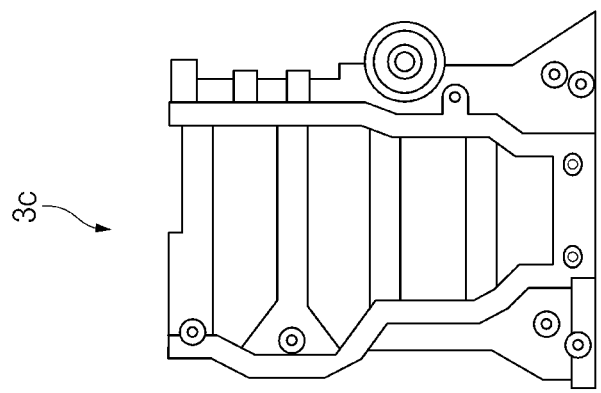
FIGS. 13A-13C are views illustrating a ladder frame according to models, which may be fastened by the fastening apparatus.
Figure 13B:
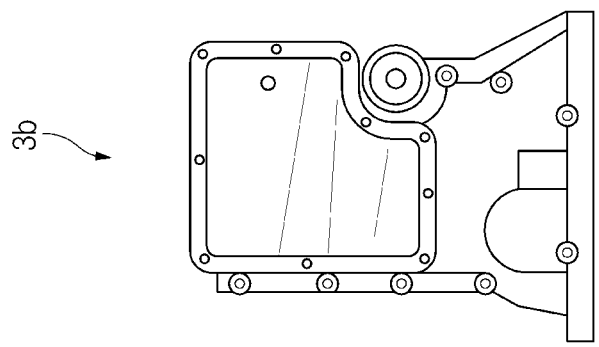
Figure 13A:
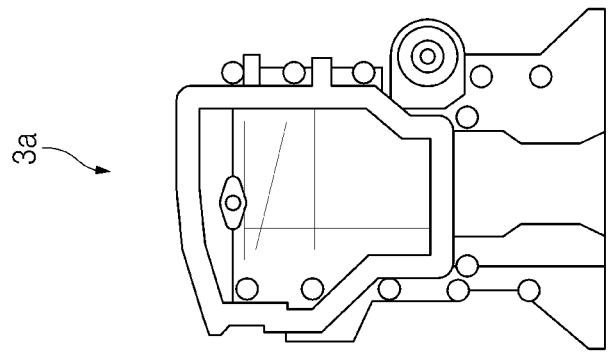

As illustrated in FIGS. 13A, 13B, and 13C, different models of the ladder frames 3a, 3b, and 3c have fastening holes, positions of which are different from each other. The fastening apparatus 100 according to the present disclosure may fasten the different models of the ladder frames 3a, 3b, and 3c to an engine block by adjusting the positions of the fastening devices 10 by the variation mechanism 20 according to the positions of the fastening holes of the ladder frames 3a, 3b, and 3c.

Meanwhile, as illustrated in FIG. 5, although eight fastening devices 10 are exemplified as the plurality of fastening devices 10, the present disclosure is not limited thereto. For example, the number of the fastening devices 10 may be two, four, six, ten, or the like according to the type of the workpiece W.

Further, the number of the mounted fastening devices 10 may vary in accordance with a change in production demands, a change of the type of the workpiece, and the like. For example, among the plurality of initially mounted fastening devices 10, some fastening devices 10 are separated or some fastening devices 10 are additionally mounted, and thus, the number of the fastening devices 10 may be increased or decreased. For example, in a state in which eight fastening devices 10 are mounted in accordance with a workpiece having eight fastening holes, when the workpiece is changed to a workpiece having six fastening holes later, two fastening devices 10 are separated, and the fastening holes of the workpiece may be simultaneously fastened only using six fastening devices 10.

In the above-described fastening apparatus 100 according to the present disclosure, the base blocks 25 may be moved along the radial coordinate and the angular coordinate of the polar coordinate system by the first and second movement mechanisms 30 and 40 of the variation mechanism 20, and accordingly, the positions of the fastening devices 10 may individually vary, so that while the user flexibly cope with various models of workpieces having various components, a fastening operation may be promptly and effectively performed, the user may flexibly cope with a change in production, and a schedule of the fastening operation by simple teaching may be reduced.

Further, in the fastening apparatus according to the present disclosure, the support 130 to which the variation mechanism 20 is connected may be moved by the movable structure 120 in a vertical direction, so that the vertical positions of the fastening devices 10 may be adjusted, and the positions of the fastening devices 10 may variously vary in accordance with various models of the workpiece having various components.

According to the present disclosure, positions of fastening devices may flexibly vary in accordance with fastening positions of workpieces, the number of the fastened workpieces, and the like according to types, shapes, structures and the like of the workpieces. Because of this, fastening operations of the plurality of fastening devices may be flexibly executed, so that a flexible manufacturing system may be effectively constructed.

The above description is merely illustrative description of the technical spirit of the present disclosure, and various modifications and deformations may be made by those skilled in the art to which the present disclosure pertains without departing from the desired feature of the present disclosure.

Thus, the forms that are disclosed in the present disclosure are not for limiting but for describing the technical spirit of the present disclosure, and the scope of the technical spirit of the present disclosure is not limited by the forms. The protection scope of the present disclosure should be interpreted by the present disclosure and all the technical spirit corresponding to the equivalents thereof should be interpreted to be included in the scope of a right of the present disclosure.

What is claimed is:

1. A fastening apparatus comprising:
a plurality of fastening devices; and
a variation mechanism configured to vary fastening positions of the plurality of fastening devices,
wherein the variation mechanism comprises:
a first support plate;
a second support plate spaced downwardly apart from the first support plate;
a plurality of base blocks movably connected to the second support plate, wherein each base block of the plurality of base blocks is configured to extend along a radial direction of the second support plate;
a first movement mechanism configured to move each base block of the plurality of base blocks along a circumferential direction of the second support plate; and
a second movement mechanism configured to move each fastening device of the plurality of fastening devices, and
wherein:
the first movement mechanism is connected to an upper surface of each base block of the plurality of base blocks through a bracket,
the second movement mechanism is connected to a lower surface of each base block of the plurality of base blocks, and
each fastening device of the plurality of fastening devices is connected to the second movement mechanism configured to move the each fastening device along a longitudinal direction of a corresponding base block of the plurality of base blocks.

2. The fastening apparatus of claim 1, wherein the variation mechanism is configured to individually move the plurality of fastening devices along a radial coordinate and an angular coordinate of a polar coordinate system.

3. The fastening apparatus of claim 1, wherein a guide member is provided on the upper surface of each base block of the plurality of base blocks.

4. The fastening apparatus of claim 1, wherein the second support plate has at least one guide rail, the at least one guide rail has a ring shape, and the plurality of base blocks move along the circumferential direction along the at least one guide rail.

5. The fastening apparatus of claim 1, wherein the first movement mechanism includes:
a plurality of driving motors individually mounted on the upper surface of each base block of the plurality of base blocks;
bevel pinions individually connected to the plurality of driving motors; and
a bevel ring gear engaged with the bevel pinions.

6. The fastening apparatus of claim 5, wherein the bevel ring gear is fixed to the first support plate.

7. The fastening apparatus of claim 1, wherein the second movement mechanism includes:
a plurality of linear guides individually fixed to the lower surface of each base block of the plurality of base blocks; and
a plurality of movable blocks individually connected to the plurality of linear guides to be movable.

8. The fastening apparatus of claim 7, wherein the plurality of fastening devices are individually connected to a corresponding movable block of the plurality of movable blocks.

9. The fastening apparatus of claim 8, wherein each linear guide of the plurality of linear guides includes:
a rotatable lead screw;
a nut configured to travel along the rotatable lead screw; and
a motor configured to rotate the rotatable lead screw.

10. The fastening apparatus of claim 9, wherein the nuts are fixed to the movable blocks, respectively.

11. The fastening apparatus of claim 1, further comprising:
a plurality of cable carriers configured to guide a plurality of cables individually connected to the variation mechanism and the plurality of fastening devices from a center toward an upper side of the variation mechanism.

12. A fastening apparatus comprising:
a main structure;
a movable structure configured to vertically move relative to the main structure;

a support connected to the movable structure;

a plurality of fastening devices mounted on the support; and a variation mechanism configured to vary fastening positions of the plurality of fastening devices, wherein the variation mechanism comprises:

a first support plate;

a second support plate spaced downwardly apart from the first support plate;

a plurality of base blocks movably connected to the second support plate, wherein each base block of the plurality of base blocks is configured to extend along a radial direction of the second support plate;

a first movement mechanism configured to move each base block of the plurality of base blocks along a circumferential direction of the second support plate; and a second movement mechanism configured to move each fastening device of the plurality of fastening devices, and wherein:

the first movement mechanism is connected to an upper surface of each base block of the plurality of base blocks through a bracket, the second movement mechanism is connected to a lower surface of each base block of the plurality of base blocks, and each fastening device of the plurality of fastening devices is connected to the second movement mechanism configured to move the each fastening device along a longitudinal direction of a corresponding base block of the plurality of base blocks.

13. The fastening apparatus of claim 12, wherein the variation mechanism is configured to individually move the plurality of fastening devices along a radial coordinate and an angular coordinate of a polar coordinate system.

* * * * *